Figure 1:
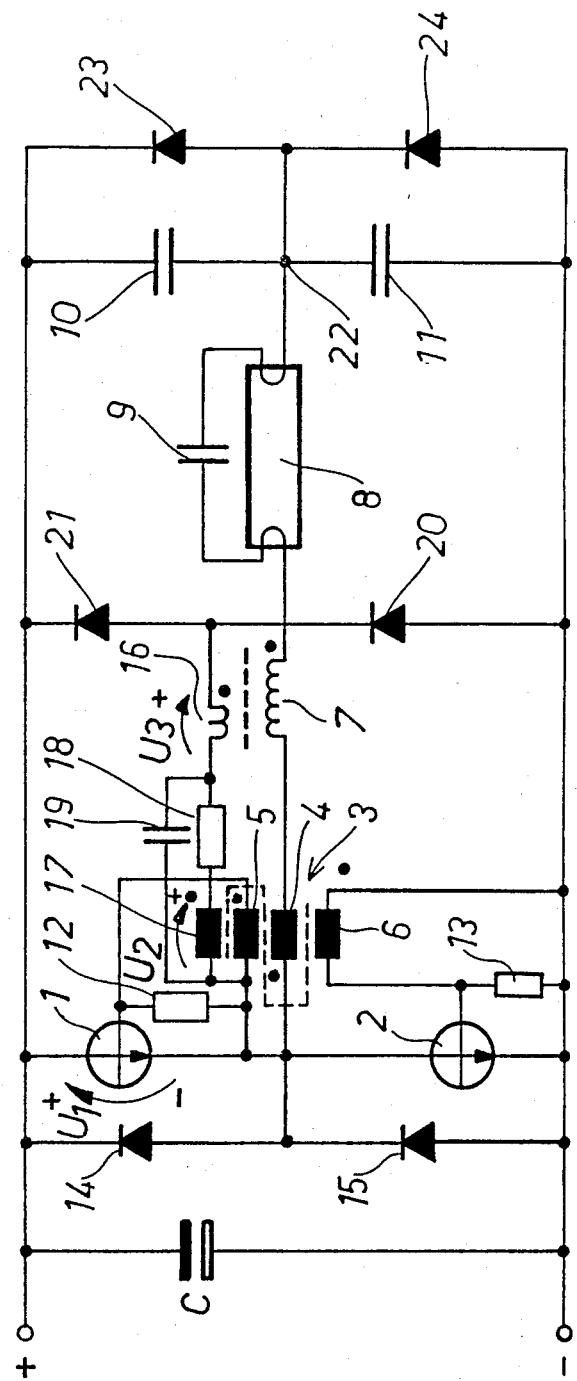

United States Patent [19]

Virta

[11] Patent Number: 4,603,378
[45] Date of Patent: Jul. 29, 1986

[54] INVERTER CIRCUIT WITH A CONTROL CIRCUIT FOR LEADING TRANSISTORS MORE EFFECTIVELY INTO A TURNED-OFF STATE

[75] Inventor: Matti Virta, Helsinki, Finland

[73] Assignee: Oy Helvar, Helsinki, Finland

[21] Appl. No.: 732,006

[22] PCT Filed: Sep. 5, 1984

[86] PCT No.: PCT/FI84/00061
§ 371 Date: May 2, 1985
§ 102(e) Date: May 2, 1985

[87] PCT Pub. No.: WO85/01180
PCT Pub. Date: Mar. 14, 1985

[30] Foreign Application Priority Data

Sep. 6, 1983 [FI] Finland .................................. 833186

[51] Int. Cl.⁴ .......................................... H02M 7/5387
[52] U.S. Cl. .................................. 363/56; 315/209 R; 315/244; 363/132
[58] Field of Search ................. 363/56/132; 331/114; 315/209 R, 239, 278, 244

[56] References Cited

U.S. PATENT DOCUMENTS

| 4,045,711 | 8/1977 | Pitel | 331/113 A |
|---|---|---|---|
| 4,164,014 | 8/1979 | Crowe et al. | 363/56 |
| 4,370,600 | 1/1983 | Zansky | 363/56 |
| 4,392,087 | 7/1983 | Zansky | 363/132 |
| 4,553,070 | 11/1985 | Sairanen et al. | 315/209 R |

Primary Examiner—William H. Beha, Jr.
Attorney, Agent, or Firm—Zarley, McKee, Thomte, Voorhees & Sease

[57] ABSTRACT

An inverter circuit, comprising a control circuit for improving the switching off of transistors (1 and 2). The control circuit includes a secondary winding (16) for an inductive winding (7) included in a load circuit, said secondary winding being connected in series with a winding (17) for a base control transformer (3) of transistors (1 and 2). The control circuit closes itself by way of a diode (21 or 20) and transistor (1 or 2). Thus, a voltage induced in secondary winding (16) indicating the rate of decrease of the collector current of transistor (1 or 2) improves or accelerates the switching off of transistor (1 or 2) when the hazard of simultaneous conduction of transistors increases e.g. as a result of the reversal of loading state or variation of individual characteristics (such as storage time) of transistors.

3 Claims, 2 Drawing Figures

INVERTER CIRCUIT WITH A CONTROL CIRCUIT FOR LEADING TRANSISTORS MORE EFFECTIVELY INTO A TURNED-OFF STATE

The present invention relates to an inverter circuit, comprising:
two transistors connected in series across the terminals of a direct-current supply
a control transformer for transistors, the secondary windings of said transformer being connected to transistor base control circuits,
a load circuit including a series connection of inductive winding and capacitor and being connected across a point between transistors and a power source, and
a base current control circuit, including the inductive winding's secondary winding and the base control transformer's winding, connected to said secondary winding.

This type of inverter circuit is anticipated in U.S. Pat. No. 4,045,711. In that publication, the base current of transistors is controlled primarily by means of the secondary winding of a resonance circuit's inductive winding in a manner that a base current phase shifts forward relative to the collector current of a transistor, bringing of transistors into a conductive state being delayed so that the current of one transistor has had time to cut off despite the storage time. This eliminates the simultaneous conducting of transistors and power losses caused thereby.

Occurring in practice, however, are the following variation factors whose action is not compensated for by this prior art circuit:

1. The frequency and/or amplitude of a resonance circuit current may fluctuate considerably with varying load. As the frequency and/or amplitude increases, the hazard of simultaneous conducting of transistors increases. In order to prevent this, the leading of a transistor into a turned-off or non-conductive state should be made more effective or sped up, but this cannot be achieved by the prior art circuit switching.

2. The individual properties of transistors vary considerably. For example, the voltage drops occurring across different transistors with the same base current are unequal. When the voltage drop is minor, a transistor is deep in saturation and can be slowly led into a non-conductive state, in other words the "storage time" of a transistor will be long. The prior art circuit switching does not at all observe this individual variation of the properties of transistors, which is why transisotrs must be selected carefully if simultaneous conductivity of transistors is to be avoided.

An object of the invention is to provide an inverter circuit which includes a base current control circuit for observing both the state of a load and the state of a transistor.

This object is achieved by means of an inverter circuit of the invention whose characteristic features are set forth in the annexed claims.

Figure 2:
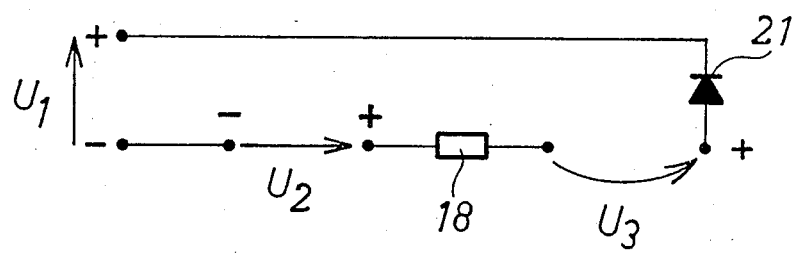

One practical embodiment of the invention will now be described in more detail with reference made to the accompanying drawings, in which FIG. 1 shows a circuit diagram of an inverter circuit of the invention applied as a ballast for a discharge lamp and FIG. 2 shows a voltage division diagram of a base current control circuit, the respective voltages being indicated in FIG. 1 in the situation where transistor 1 is conductive.

Aside from a novel base control circuit, a corresponding inverter circuit and its operation has been disclosed in the Applicants' FI Patent specification No. 63147. However, the structure and operation of an inverter circuit will now be briefly explained. Across the direct-current terminals + and − are connected a filtering capacitor C as well as two in series connected transistors 1 and 2, geared in alternating phase operation by means of a base control transformer 3. Secondary windings 5 and 6 of said base control transformer 3 are connected to the bases of transistors 1 and 2 in a manner that the bases of each transistor receive opposite phase control voltages relative to each other. Thus, when one transistor is conductive the other is non-conductive and vice versa.

Across a point between transistors 1 and 2 and a power source is connected a load circuit, comprising an inductive winding 7 and capacitors 10 and 11 connected in series therewith, the current flowing through said capacitors alternately on successive half-cycles. Connected in series with a series resonance circuit provided by winding 7 and capacitors 10 and 11 is a connection in parallel consisting of a lamp 8 and an ignition capacitor 9. Resonance capacitors 10 and 11 are accompanied by stabilizing diodes 23 and 24 which restrict a voltage across capacitors 10 and 11 in a manner that the voltage will be stabilized at point 22.

Protective diodes 14 and 15 provide the current of inductance 7 with a flow path when both transistors 1 and 2 are in non-conductive state. Resistors 12 and 13, connected to the base-emitter circuit of transistors 1 and 2, serve to damp undesired oscillations in a per se known manner.

The base current control circuit includes a secondary winding 16 for inductive winding 7, said secondary winding being connected in series with a winding 17 of base control transformer 3. When transistor 1 is in conductive state, the base current control circuit closes itself through a diode 21 and the collector-emitter circuit of transistor 1. Accordingly, when transistor 2 is in conductive state, the control circuit closes itself through a diode 20 and transistor 2. Whilst one of the diodes 20, 21 closes the circuit of said control circuit, the other diode will prevent the current from flowing through the presently conductive transistor and control circuit to the power source terminal which is opposite relative to the presently conductive transistor.

A control circuit series resistor 18 limits the control current to proper strength.

A capacitor 19 is not absolutely necessary but it provides the following action: With transistor 1 or 2 turning non-conductive, current peak produced by the circuit inductance strives to pass through diode 20 or 21 in wrong direction. In order to eliminate the effect of this current peak on a current transformer made up by windings 17 and 5, said peak is passed through capacitor 19.

The operation of a base current control circuit proceeds as follows. It is presumed that transistor 1 is in conductive state. The collector current of transistor 1 begins to fall in this example at a falling rate determined by the resonance frequency of a load circuit. Falling of the current in winding 4 results in the corresponding fall of a base current flowing through winding 5. When the base current falls down to zero and turns negative, the transistor still remains conductive for a short period due to the stored charge carriers. As the base current grows in negative direction until the charge carriers are eliminated, the transistor will be switched off. In order to switch off transistor 1 before transistor 2 turns conductive, the base current control circuit functions as follows. A voltage $U_3$ inducing in winding 16 is dependant on the falling rate of the collector current of transistor 1, selected to be conductive in this study. When the falling rate or rate of decrease is sufficient to generate voltage $U_3$, which together with voltage $U_2$ exceeds the voltage drop $U_1$ of transistor and the biasing voltage of diode 21, a control current begins to flow in the control circuit. The control current generated by voltage $U_3$ loads by way of a current transformer made up by windings 17 and 5/6 a control transformer 3 in a manner that the decrease, reversal of the forward base current of transistor 1 and backward increase will be sped up, the elimination of charge carriers or transmitters from the transistor being sped up accordingly, and the transistor can be switched off more quickly. Essential in this respect is also that the base current is not acted upon until in the collector current decrease phase, whereby the transistor losses shall not increase due to the fact the transistor would be too early switched out of the saturation where its voltage drop is at minimum. It will be appreaciated further that the circuit automatically observes the state of a load since, with the frequency or amplitude increasing, the rate of decrease of the collector current increases accordingly and the voltage $U_3$ inducing in secondary winding 16 increases thus accelerating the switching of transistor out of the saturation during the collector current decrease phase.

Since the collector-emitter circuit of a transistor is part of the control circuit, it can be noted from the voltage diagram of FIG. 2 that the control automatically observes differences in the characteristics of individual transistors. Since the winding voltage $U_3$ is in series with the collector-emitter voltage $U_1$ of a given conductive transistor 1 or 2, said voltage $U_1$ decreases control voltage $U_3$ the more the higher said collector-emitter voltage $U_1$ is. On the other hand, if $U_1$ is low and transistor is deep in saturation and switched off slowly, voltage $U_1$ will decrease control voltage $U_3$ less, the latter thus generating a higher control current which in turn increases the load on transformer 3 for decreasing and reversing and/or increasing in negative direction at a faster rate.

On the following half-cycle, with transistor 2 conducting and transistor 1 in non-conductive state, the operation of said control circuit is exactly the same, only the direction of control voltage $U_3+U_2$ will be reversed and the control circuit closed through transistor 2 and diode 20.

It will be appreciated that achieved by a simple circuitry is a control which automatically observes the variations appearing in the state of a load or individual characteristics of transistors. Thus, no additional circuits are required for observing the state of load in control and transistors can be cheaper, not particularly selected transistors.

Although the invention has been described applied in an inverter circuit for the ballast of a dischage lamp, it is obvious that the invention can be applied in all inverter circuits regardless of the type of load. Neither is the invention limited to the case where a base control transformer is fitted with a primary winding 4 connected with a load circuit but, instead, the control for secondary windings 5 and 6 of a base control transformer can be applied as a positive control from an external control source, the circuit not being freely oscillating. A control circuit improving the switching off of transistors operates in this case equally well.

I claim:

1. An inverter circuit, comprising:
    two transistors (1, 2) connected in series across the terminals of a direct-current supply,
    a control transformer (3) for transistors, the secondary windings (5, 6) of said transformer being connected to base control circuits of transistors (1, 2),
    a load circuit including a series connection of an inductive winding (7) and a capacitor (10, 11) and being connected across a point between transistors (1 and 2) and a power source, and
    a base current control circuit, including a secondary winding (16), characterized in that the base current winding (17) for a base control transformer (3), said latter winding being connected to said secondary winding (6), characterized in that the base current control circuit further comprises a collector-emitter circuit for transistor (1, 2) and that the control circuit is connected to the terminals of a power source by way of two rectifiers (20, 21), a given one of said rectifiers closing the control circuit while the other rectifier prevents the current from flowing through a presently conductive transistor (1 or 2) and control circuit (16, 17) to the power source terminal (− or +) opposite to said presently conductive transistor, whereby a voltage ($U_3$), induced in secondary winding (16) of said inductive winding and indicating the rate of decrease of the collector current of transistor (1 or 2), said voltage ($U_3$) being decreased by a collector-emitter voltage ($U_1$) of transistor (1 or 2), improves the switching off of transistor (1 or 2) as the hazard of simultaneous conduction of transistors (1 and 2) increases.

2. An inverter circuit as set forth in claim 1, characterized in that the base current control circuit comprises a series connection, including a secondary winding (16) for inductive winding (7), a winding (17) for base control transformer (3), a rectifier (21 or 20) and a transistor (1 or 2) as well as a resistor (18) determining the strength of a control current.

3. An inverter circuit as set forth in claim 1 or 2, characterized in that the base current control circuit is connected to a point between diodes (20 and 21), connected in series and in backward direction across the terminals of a power source.

* * * * *